(12) United States Patent
Chen

(10) Patent No.: US 8,990,870 B2
(45) Date of Patent: Mar. 24, 2015

(54) MULTI-SOURCE ASSISTED CONTENT DELIVERING SYSTEM

(75) Inventor: Mi Chen, Aurora, CO (US)

(73) Assignee: EchoStar Technologies L.L.C., Englewood, CO (US)

(*) Notice: Subject to any disclaimer, the term of this patent is extended or adjusted under 35 U.S.C. 154(b) by 153 days.

(21) Appl. No.: 13/205,287

(22) Filed: Aug. 8, 2011

(65) Prior Publication Data

US 2013/0042280 A1    Feb. 14, 2013

(51) Int. Cl.
*H04N 7/173* (2011.01)
*H04N 21/442* (2011.01)
*H04N 21/63* (2011.01)

(52) U.S. Cl.
CPC ....... *H04N 21/44209* (2013.01); *H04N 21/631* (2013.01)
USPC ................................ 725/94; 725/86; 725/109

(58) Field of Classification Search
USPC .............................................. 725/94, 86, 109
See application file for complete search history.

(56) References Cited

U.S. PATENT DOCUMENTS

| | | | | |
|---|---|---|---|---|
| 6,804,510 | B1* | 10/2004 | Bates et al. | 455/414.4 |
| 7,469,269 | B2* | 12/2008 | Klein et al. | 709/203 |
| 8,103,269 | B2* | 1/2012 | Choi | 455/426.1 |
| 2002/0162109 | A1* | 10/2002 | Shteyn | 725/87 |
| 2005/0003808 | A1* | 1/2005 | Bates et al. | 455/414.4 |
| 2011/0030010 | A1* | 2/2011 | Overbaugh | 725/45 |
| 2011/0145869 | A1* | 6/2011 | Rahman | 725/87 |

* cited by examiner

*Primary Examiner* — Olugbenga Idowu
(74) *Attorney, Agent, or Firm* — Ingrassia Fisher & Lorenz, P.C.

(57) ABSTRACT

While receiving content from a source via a first connection, a receiver determines the connection is interrupted, selects an alternative source, and continues to receive the content from the alternative source via a second connection. In some implementations, the alternative source may be a server. In implementations, the alternative source may be additional receivers configured in a peer-to-peer arrangement. In various implementations, after the receiver determines that the first connection is interrupted, the receiver may utilize the second connection until finished receiving the content, continue receiving the content utilizing the first connection once no longer interrupted, or determine that the second connection is interrupted and select an additional alternative source to continue receiving the content from via a third connection. In one or more implementations, various components of the broadcast system may assist the receiver in continuing to receive the content from the alternative source via the second connection.

14 Claims, 3 Drawing Sheets

MULTI-SOURCE ASSISTED CONTENT DELIVERING SYSTEM

FIELD OF THE INVENTION

This disclosure relates generally to content receivers, and more specifically to assisting content receivers to continue receiving content using alternative sources when an initial communication connection is interrupted.

SUMMARY

The present disclosure discloses systems and methods for multi-source assisted content delivery. A content receiver may utilize a first communication connection to receive an instance of content from a content source. While receiving the instance of content, the content receiver may determine that the first communication connection is interrupted. In some cases, the interruption may be a partial interruption of the first communication connection. In other cases, the interruption may be a total interruption of the first communication connection. The content receiver may select an alternative content source and may continue to receive the instance of content from the alternative content source via a second communication connection. Thus, other sources of delivery may be utilized when the first communication connection is endangered and/or no longer reliable.

In some implementations, the alternative content source may be a server such as an on demand content server, a media server, an IPTV (internet protocol television) server, and/or other such server device operable to store and/or transmit the instance of content to the content receiver and/or additional content receivers. In implementations, the alternative content source may be one or more of the additional content receivers that may be configured to communicate with the content receiver in a peer-to-peer communication arrangement.

In various implementations, after the content receiver determines that the first communication connection is interrupted and continues receiving the instance of content utilizing the second communication connection, the content receiver may utilize the second communication connection until finished receiving the instance of content. However, in other implementations, the content receiver may monitor the first communication connection and may continue receiving the instance of content utilizing the first communication connection once the first communication connection is no longer interrupted. In yet other implementations, the content receiver may determine that the second communication connection is interrupted and may select an additional alternative content source and may continue receiving the instance of content from the additional alternative content source via a third communication connection.

In one or more implementations, various components of the broadcast system, of which the content receiver is a part, may assist the content receiver in continuing to receive the instance of content from the alternative source via the second communication connection. Such various components may assist in detecting when the first communication connection is interrupted, communicating alternative sources to the content receiver, transmitting and/or storing the instance of content at alternate sources for the content receiver, and so on.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

DETAILED DESCRIPTION OF THE EMBODIMENTS

Figure 1A:
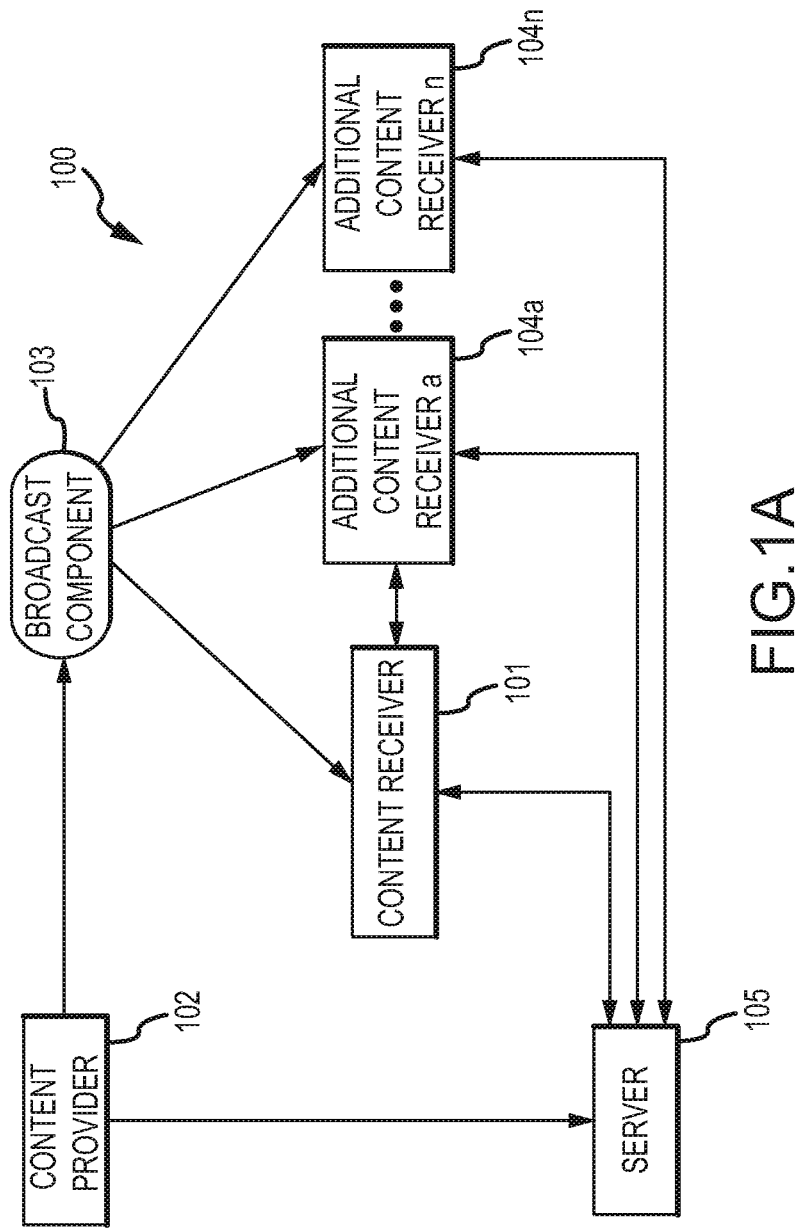
FIG. 1A is a block diagram illustrating a system for multi-source assisted content delivery.

The description that follows includes sample systems, methods, and computer program products that embody various elements of the present disclosure. However, it should be understood that the described disclosure may be practiced in a variety of forms in addition to those described herein.

Content receivers (such as set top boxes, television receivers, digital video recorders, mobile computers, cellular telephones, smart phones, tablet computers, desktop computers, and so on) may receive content (such as television programs, movies, other kinds of video files, music, images, and so on) from one or more content providers (such as satellite television programming providers, cable television programming providers, Internet service providers, video on demand providers, pay-per-view movie providers, digital music providers, and so on) via one of more communication connections (such as satellite communication connections, coaxial cable communication connections, Internet communication connections, radio-frequency connections, and so on). Such content receivers may play such received content using one or more presentation devices to present the received content and/or may store the received content for later presentation.

However, a communication connection may be interrupted while a content receiver is utilizing the communication connection to receive an instance of content (such as a television program) from a content provider. For example, a satellite communication connection may be interrupted by rain (a condition often referred to as rain-fade), snow, and/or other weather and/or atmospheric conditions. By way of another example, a coaxial cable communication connection may be interrupted by inadequate bandwidth, power outages affecting content provider broadcast components, and other such problems.

If the communication connection is interrupted while the content receiver is playing the instance of content being received, the play of the instance of content may be incomplete and may miss one or more portions and/or fail entirely. If the communication connection is interrupted while the content receiver is recording the instance of content being received, the entirety of the instance of content may not be stored. In such cases, a user of the content receiver may be unable to play and/or store the instance of content as expected.

The present disclosure discloses systems and methods for multi-source assisted content delivery. A content receiver that is utilizing a first communication connection to receive an instance of content from a content source may determine that the first communication connection is interrupted, select an alternative source for the instance of content, and continue to receive the instance of content from the alternative content source via a second communication connection. Thus, other sources of delivery may be utilized when the first communication connection is endangered and/or no longer reliable. In this way, the content receiver may be able to receive the instance of content despite the interruption of the first communication connection.

Although the present disclosure discusses receiving content via one or more communication connections, it is understood that the term "communication connection" applies to any instance of communication utilized to receive content and not merely communication methods that are defined as "connection-based." As such, the term "communication connection" in the present disclosure may apply to both communication methods that are defined as "connection-based" as well as communication methods that are defined as "connectionless."

FIG. 1A is a block diagram illustrating a system 100 multisource assisted content delivery. The system 100 includes a content receiver 101, one or more content providers 102, one or more broadcast components 103, one or more additional content receivers 104a-104n, and/or one or more servers 105.

The content receiver and/or additional content receivers may be any kind of content receiver, such as a set top box, a television receiver, a digital video recorder, a mobile computer, a cellular telephone, a smart phone, a tablet computer, a desktop computer, and/or any other device that is operable to receive content. The content provider may be any kind of content provider, such as a satellite television programming provider, a cable television programming provider, an Internet service provider, a video on demand provider, a pay-per-view movie provider, a digital music provider, and/or any other entity that is operable to transmit content to the content receiver and/or the additional content receivers. The broadcast component may be any kind of component that may be utilized to transmit content, such as a satellite transmission device, a coaxial cable transmission device, an internet protocol transmission device, a radio-frequency transmission device, and/or any other transmission device that a content provider may utilize to transmit content to the content receiver and/or the additional content receivers.

The content receiver 101 may receive one or more instances of content (such as one a television program, a movie, another video file, music, an image, and/or other such instance of content), transmitted by the content provider 102 utilizing the broadcast component 103, via one or more communication connections (such as a satellite communication connection, a coaxial cable communication connection, an internet protocol communication connection, a radio-frequency connection, and/or any other kind of communication connection that the content receiver may utilize to receive the instances of content). While receiving an instance of content via a first communication connection from the content provider (or, the content source), the content receiver may determine that the first communication connection is interrupted. In some cases, the interruption may be partial. In other cases, the interruption may be total. In response to detecting that the first communication connection is interrupted, the content receiver may select an alternative content source and may then continue receiving the instance of content from the alternative content source via a second communication connection.

Figure 1B:
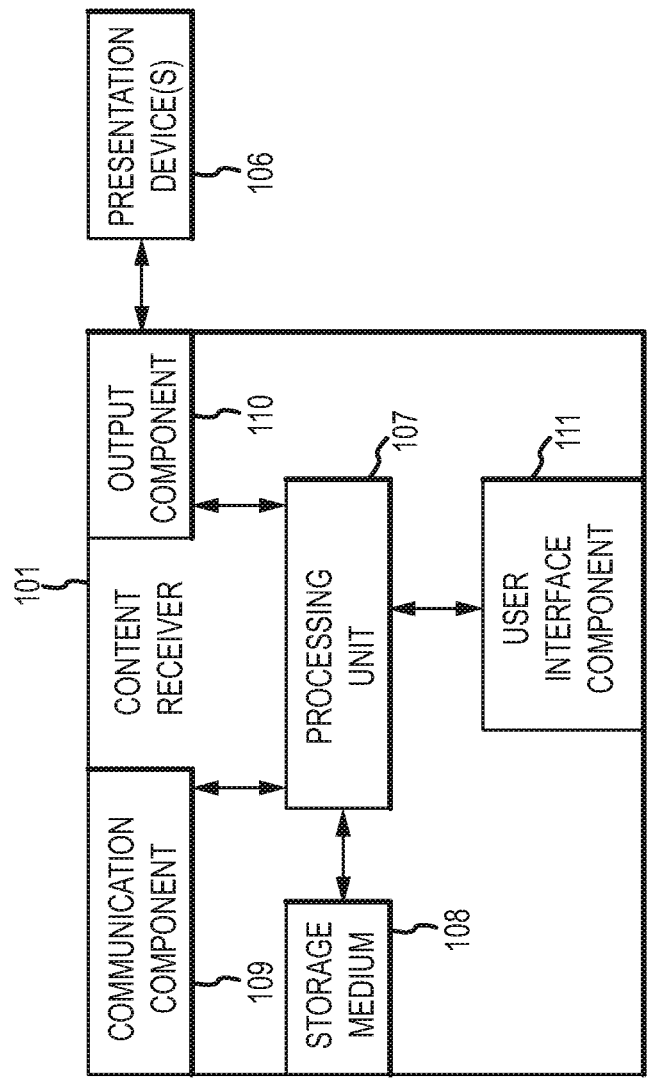
FIG. 1B is a block diagram illustrating a content receiver that may be utilized in the system of FIG. 1A.

FIG. 1B illustrates an example content receiver 101 that may be utilized in the system 100 of FIG. 1A. As illustrated, the content receiver 101 may include one or more processing units 107, one or more non-transitory storage media 108 (which may take the form of, but is not limited to, a magnetic storage medium; optical storage medium; magneto-optical storage medium; read only memory; random access memory; erasable programmable memory; flash memory; and so on), one or more communication components 109, one or more output components 110, and/or one or more communication components 111.

The content receiver 101 may utilize the communication component 109 to receive content from one or more content providers (such as the content provider 102 of FIG. 1A) and/or communicate with other devices (such as the server 105 and/or the additional content receivers 104a-104n of FIG. 1A). The processing unit 107 may execute instructions stored in the non-transitory storage medium 108 to present content received by the communication component and/or stored in the non-transitory storage medium on one or more presentation devices (such as one or more televisions, computer monitors, liquid crystal displays, plasma screen displays, speakers, and so on) utilizing the output component 110. The processing unit may also receive input from one or more users and/or transmit output to the one or more users via the user interface component 111.

Returning to FIG. 1A, in some situations, the second communication connection utilized by the content receiver 101 to continue receiving the instance of content may be a different type of communication connection than the first communication connection. For example, the first communication connection may be a satellite communication connection which is interrupted by rain, snow, and/or other weather conditions. In this example, the content receiver may continue receiving the instance of content from an alternative content source via an internet protocol communication connection.

In other situations, the second communication connection may be a different communication connection of the same type of communication connection as the first communication connection. For example, the first communication connection may be a first internet protocol communication connection which is interrupted by inadequate bandwidth. In this example, the content receiver may continue receiving the instance of content from an alternative content source via a second internet protocol communication connection.

In some cases, the second communication connection may entirely replace the first communication connection. However, in other cases, particularly where the first communication is partially interrupted instead of totally interrupted, the second communication connection may be utilized to supplement the first communication connection as opposed to totally replacing the first communication connection. For example, where the first communication connection is one or more connections to one or more peers in a peer-to-peer communication configuration and the first communication connection becomes unreliable, the second communication connection may include adding one or more other peers in the peer-to-peer communication configuration as well as removing one or more of the peers of the first communication connection that may be determined to be the source of the unreliability. As such, each peer and/or one or more groups of peers may be considered to be a separate communication connection. In another example, where the first communication connection is a satellite connection, the second communication connection may be a second satellite connection that may be utilized to supplement receipt of the instance of content.

In some cases, the alternative content source may be the server 105. In such cases, the server may be an on demand content server, a media server, an IPTV (internet protocol television) server, and/or other such server device operable to store and/or transmit the instance of content to the content receiver and/or the additional content receivers 104a-104n. Upon selection of the server as the alternative source of content, the content receiver may communicate with the server (which may be initiated by the content receiver and/or by the server upon being notified that the content receiver has experienced a communication connection interruption) via a second communication connection in order to continue receiving the instance of content from the server instead of the broadcast component 103.

In other cases, the alternative content source may be one or more of the additional content receivers 104a-104n. In such cases, the one or more additional content receivers may be configured to communicate with the content receiver 101 in a peer-to-peer communication arrangement. Upon selection of the one or more additional content receivers as the alternative source of content, the content receiver may communicate with the one or more additional content receivers (which may be initiated by the content receiver and/or by the one or more additional content receivers upon being notified that the content receiver has experienced a communication connection interruption) via a second communication connection in order to continue receiving the instance of content from the one or more additional content receivers instead of the broadcast component 103.

In some implementations, after the content receiver 101 determines that the first communication connection is interrupted and continues receiving the instance of content utilizing the second communication connection, the content receiver may utilize the second communication connection until finished receiving the instance of content. However, in other implementations, after the content receiver determines that the first communication connection is interrupted and continues receiving the instance of content utilizing the second communication connection, the content receiver may monitor the first communication connection and may continue receiving the instance of content utilizing the first communication connection once the first communication connection is no longer interrupted.

In still other implementations, after the content receiver determines that the first communication connection is interrupted and continues receiving the instance of content utilizing the second communication connection, the content receiver may determine that the second communication connection is interrupted and may select an additional alterative content source and may continue receiving the instance of content from the additional alternative content source via a third communication connection.

Figure 2:
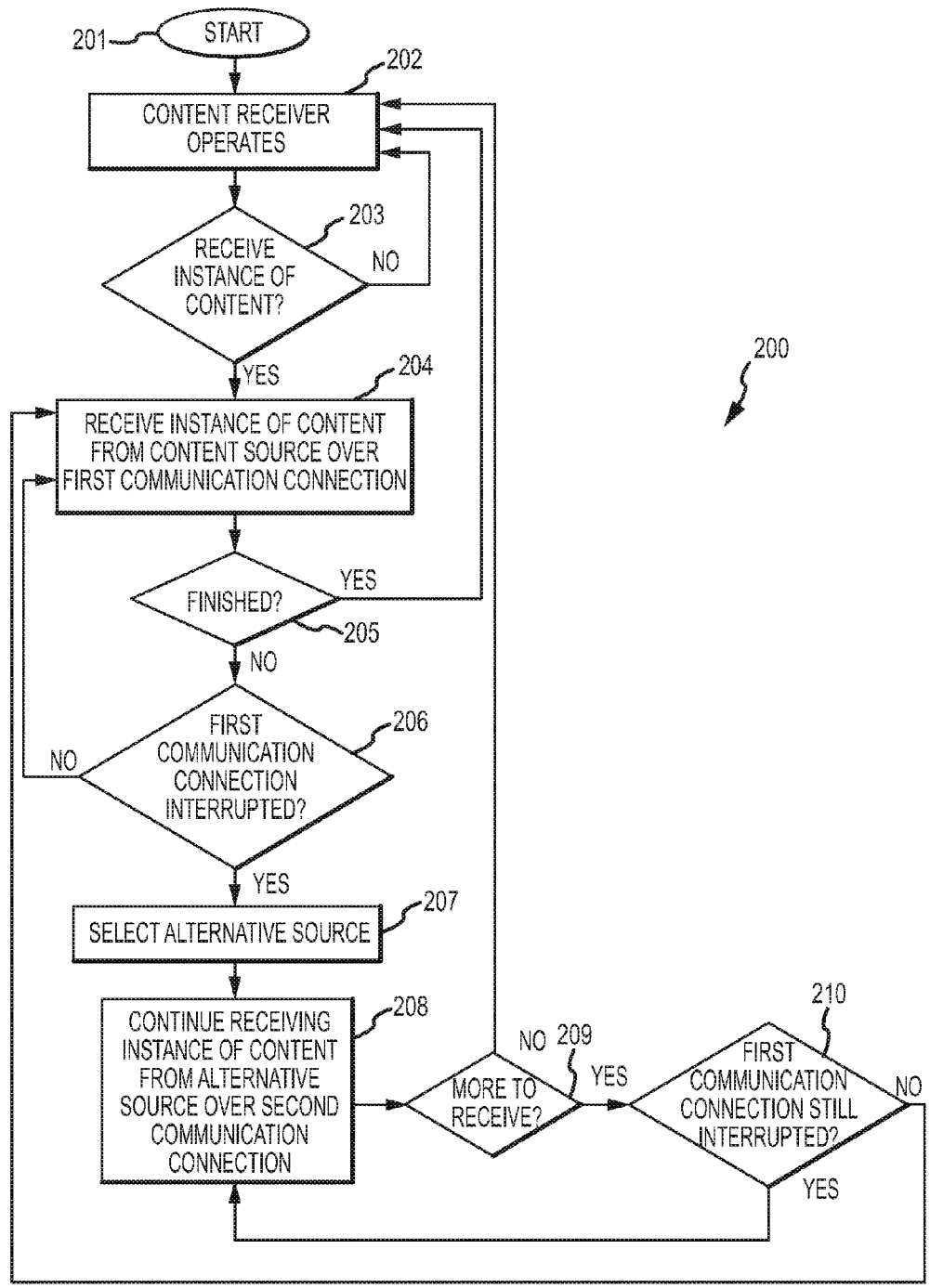
FIG. 2 is a flow chart illustrating a method for multi-source assisted content delivery. This method may be performed by the system of FIG. 1A.

FIG. 2 illustrates a method 200 for multi-source assisted content delivery. The method 200 may be performed by the content receiver 101 of FIG. 1A. The flow begins at block 201 and proceeds to block 202 where the content receiver operates. The flow then proceeds to block 203 where the content receiver determines whether or not an instance of content is being received. If so, the flow proceeds to block 204. Otherwise, the flow returns to block 202 where the content receiver continues to operate.

At block 204, after the content receiver 101 determines that an instance of content is being received, the content receiver receives the instance of content from a content source via a first communication connection. As part of receiving the instance of content, the content receiver may present the portion of the instance of content being received utilizing one or more presentations devices and/or may store the portion of the instance of content being received. The flow then proceeds to block 205 where the content receiver determines whether or not receipt of the instance of content is finished. If so, the flow returns to block 202 where the content receiver continues to operate.

At block 206, after the content receiver 101 determines that receipt of the instance of content is not finished, the content receiver determines whether or not the first communication connection is interrupted. The interruption may be partial or it may be complete. If the first communication connection is not interrupted, the flow returns to block 204 where the content receiver continues receiving the instance of content from a content source via a first communication connection. Otherwise, the flow proceeds to block 207.

At block 207, after the content receiver 101 determines that the first communication connection is interrupted, the content receiver selects an alternative content source and the flow proceeds to block 208. At block 208, the content receiver continues receiving the instance of content from the alternative content source via the second communication connection. The flow then proceeds to block 209.

At block 209, the content receiver 101 determines whether or not there is more of the instance of content to be received. If not, the flow returns to block 202 and the content receiver continues to operate. Otherwise, the flow proceeds to block 210.

At block 210, after the content receiver 101 determines that there is more of the instance of content to be received, the content receiver determines whether or not the first communication connection is still interrupted. If so, the flow returns to block 208 where the content receiver continues receiving the instance of content from the alternative content source via the second communication connection. Otherwise, the flow returns to block 204 where the content receiver continues receiving the instance of content from the content source via the first communication connection.

Although the method 200 is illustrated and described as including particular operations in a particular order, it is understood that this is for the purposes of example. Other operations may be performed in different orders without departing from the scope of the present disclosure. For example, in some implementations the operation of determining that the first communication connection is interrupted may be performed simultaneously and/or continuously with receiving the first instant of content. By way of another example, instead of continuing to receive the instance of content via the first communication connection if no longer interrupted after the first communication connection is interrupted, the content receiver 101 may continue to receive the instance of content utilizing the second communication connection after the first communication connection is interrupted until the receipt of the instance of content is complete.

Returning to FIG. 1A, in some implementations, first communication connection may be a packetized communication connection. In such implementations, the content receiver 101 may determine that the first communication connection is interrupted when more than a threshold number of packets are dropped, lost, and/or timed out; a (SNR) signal-to-noise ratio of the first communication connection exceeds a SNR ratio threshold (such as higher than 1:1); an available bit-rate for the first communication connection falls below a available bit-rate threshold, a redundancy level of the first communication connection drops below a redundancy level threshold, and/or any other metric of the first communication connection does not meet a threshold that indicates that the first communication connection is interrupted. For example, if three or less packets out of every one hundred packets are dropped or lost the content receiver may determine that the first communication connection is not interrupted. However, if more than three packets out of every one hundred packets are dropped or lost (such as four packets, fifteen packets, or all packets) the content receiver may determine that the first communication connection is interrupted.

In various implementations, the content receiver 101 may detect that the first communication connection is interrupted and continue receiving the instance of content via the second communication connection in a manner that is transparent to a user of the content receiver. As such, the user may never become aware that the first communication connection was interrupted. However, in other implementations the content receiver may notify the user that the first communication connection is interrupted and may prompt the user to select among one or more alternative content sources from which to continue receiving the instance of content.

In one or more implementations, the content provider 102, the server 105, the broadcast component 103, and/or the additional content receivers 104a-104n may assist the content receiver in continuing to receive the instance of content from the alternative source via the second communication connection.

For example, the content provider 102 may monitor the first communication connection to detect when the first communication connection is interrupted (and/or receive one or more notifications from the content receiver 101 that the first communication is interrupted). Upon detecting that the first communication connection is interrupted, the content provider may copy all or part of the instance of content to the server 105 such that the first instance of content is available to the content receiver from the server. In some cases, after copying all or part of the instance of content to the server, the content provider may instruct the server to being transmitting the instance of content directly to the content receiver.

By way of another example, in cases where the content receiver 101 selects one or more of the additional content receivers 104a-104n which are part of a peer to peer communication arrangement as the alternative content source, the server 105 may perform various roles in managing the peer to peer communication arrangement. The server may track addresses and other information for the participants in the peer to peer communication arrangement and may monitor and/or receive information regarding content stored and/or being received by the various participants. As such, the content receiver may obtain addresses and/or other information from the server regarding the one or more additional content receivers from which to continue receiving the instance of content upon detecting interruption of the first communication connection.

Alternatively, the server may transmit addresses and/or other information from the server regarding the one or more additional content receivers from which to continue receiving the instance of content to the content receiver upon notification that the first communication connection is interrupted and/or prior to interruption of the first communication connection without requiring a request from the content receiver.

By way of yet another example, the server 105 may receive an indication that the first communication connection is interrupted and may obtain all or part of the instance of content from one or more of the additional content receivers 104a-104n. As such, the instance of content may then be available to continue to be received by the content receiver 101 from the server.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

The invention claimed is:

1. A method for multi-source assisted content delivery, the method comprising:
    monitoring, by a server, content being received by a plurality of content receivers of a content broadcast system;
    transmitting, by the server, at least one address to at least one of the content receivers, the address corresponding to another content receiver receiving identical content as the at least one of the content receivers;
    determining, utilizing the at least one content receiver, that at least one first communication connection being utilized to receive at least one instance of content as part of a broadcast from at least one content source is interrupted;
    selecting, utilizing the at least one content receiver, at least one alternative content source based upon the at least one address transmitted by the server; and
    continuing to receive the at least one instance of content, utilizing the at least one content receiver, from the at least one alternative content source via at least one second communication connection,
    wherein the at least one content source comprises at least one broadcast component of the content broadcast system that includes the at least one content receiver, the at least one alternative content source comprises at least one additional content receiver of the content broadcast system, and the at least one second communication connection comprises a peer to peer communication connection, and wherein said operation of selecting, utilizing the at least one content receiver, at least one alternative content source further comprises obtaining address information for the at least one additional content receiver from at least one server prior to the determining that the at least one first communication connection is interrupted.

2. The method of claim 1, wherein the at least one first communication connection comprises a satellite communication connection, the at least one second communication connection comprises an internet protocol connection, and the satellite communication connection is interrupted due to at least one weather condition.

3. The method of claim 1, wherein the at least one content source comprises at least one broadcast component of a content broadcast system and the at least one alternative content source comprises at least one internet protocol content server.

4. The method of claim 3, wherein the at least one internet protocol content server comprises at least one internet protocol television server.

5. The method of claim 3, wherein the at least one internet protocol television server obtains the at least one instance of content from at least one additional content receiver of the content broadcast system in response to at least one indication from the at least one content receiver that the at least one first communication connection is interrupted.

6. The method of claim 1, wherein said operation of determining, utilizing at least one content receiver, that at least one first communication connection being utilized to receive at least one instance of content from at least one content source is interrupted further comprises:

monitoring, utilizing the at least one content receiver, the at least one instance of content being received via the at least one first communication connection; and determining, utilizing the at least one content receiver, that the first connection is interrupted when at least one of more than a threshold number of dropped packets are detected, more than a threshold number of packets time out; a signal-to-noise ratio associated with the first communication connection exceeds a SNR ratio threshold, an available bit-rate associated with the first communication connection falls below a available bit-rate threshold, or a redundancy level associated with the first communication connection drops below a redundancy level threshold.

7. The method of claim 1, further comprising:

determining, utilizing the at least one content receiver, that at least one first communication connection is no longer interrupted; and continuing to receive the at least one instance of content, utilizing the at least one content receiver, from the at least one content source via the at least one first communication connection.

8. A content receiver, comprising:

at least one communication component that receives content from at least one content source via at least one communication connection and address information of another content receiver receiving identical content;

at least one processing unit, communicable coupled to the at least one communication component, that:

determines that the at least one communication connection is interrupted while at least one instance of content is being received as part of a broadcast from the at least one content source via the at least one communication component, selects at least one alternative content source, and continue to receive the at least one instance of content utilizing the at least one communication component from the at least one alternative content source via at least one second communication connection, wherein the at least one content source comprises at least one broadcast component of a content broadcast system that includes the at least one content receiver, the at least one alternative content source comprises at least one additional content receiver of the content broadcast system, and the at least one second communication connection comprises a peer to peer communication connection, wherein the at least one processing unit selects the at least one alternative content source by obtaining address information for the at least one additional content receiver from at least one server prior to the determining that the at least one communication connection is interrupted, wherein the at least one server monitors content being received by a plurality of content receivers of the content broadcast system and transmits the address information to the at least one communication component based upon the monitoring.

9. The content receiver of claim 8, wherein the at least one processing unit determines that the at least one first communication connection is no longer interrupted and continues receiving the at least one instance of content from the at least one content source via the at least one first communication connection.

10. The content receiver of claim 8, wherein the at least one processing unit, determines that the at least one communication connection is interrupted when the at least one processing unit detects at least one of more than a threshold number of dropped packets while receiving the at least one instance of content, more than a threshold number of packets time out; a signal-to-noise ratio associated with the first communication connection exceeds a SNR ratio threshold, an available bit-rate associated with the first communication connection falls below a available bit-rate threshold, or a redundancy level associated with the first communication connection drops below a redundancy level threshold.

11. The content receiver of claim 8, wherein the at least one first communication connection comprises a satellite communication connection, the at least one second communication connection comprises an internet protocol connection, and the satellite communication connection is interrupted due to at least one weather condition.

12. The content receiver of claim 8, wherein the at least one content source comprises at least one broadcast component of a content broadcast system and the at least one alternative content source comprises at least one internet protocol content server.

13. The content receiver of claim 12, wherein the at least one internet protocol television server obtains the at least one instance of content from at least one additional content receiver of the content broadcast system in response to at least one indication from the at least one communication component that the at least one first communication connection is interrupted.

14. The content receiver of claim 8, wherein the at least one processing unit performs at least one of presenting the at least one instance of content via at least one presentation device while the at least one instance of content is being received or storing the at least one instance of content in at least one non-transitory storage medium while the at least one instance of content is being received.

\* \* \* \* \*